US006953182B2

United States Patent
Lovell et al.

(10) Patent No.: US 6,953,182 B2
(45) Date of Patent: Oct. 11, 2005

(54) RETAINER LOCK NUT FOR FLUID PRESSURE CONTROL DEVICE

(75) Inventors: Michel K. Lovell, Marshalltown, IA (US); Wayne R. Faas, Marshalltown, IA (US); Michael M. Anderson, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 42 days.

(21) Appl. No.: 10/641,157

(22) Filed: Aug. 15, 2003

(65) Prior Publication Data

US 2004/0129907 A1 Jul. 8, 2004

Related U.S. Application Data

(60) Provisional application No. 60/410,620, filed on Sep. 13, 2002.

(51) Int. Cl.[7] .............................................. F16K 31/145
(52) U.S. Cl. ........................ 251/61; 251/61.5; 251/214
(58) Field of Search ........................ 251/61, 61.2, 61.5, 251/214; 411/190, 204, 427, 955

(56) References Cited

U.S. PATENT DOCUMENTS

| | | | | |
|---|---|---|---|---|
| 2,665,711 A | * | 1/1954 | Parks | 251/61.5 |
| 3,147,950 A | * | 9/1964 | Milleville | 251/214 |
| 4,354,425 A | | 10/1982 | Bruton et al. | |
| 5,618,143 A | * | 4/1997 | Cronin et al. | 411/220 |
| 6,042,081 A | | 3/2000 | Anderson | |

FOREIGN PATENT DOCUMENTS

| | | |
|---|---|---|
| DE | 1119073 | 12/1961 |
| GB | 330091 | 6/1930 |

OTHER PUBLICATIONS

Copy of Written Opinion for International Patent Application No. PCT/US03/26576, dated Aug. 26, 2004, 5 pages.
Copy of International Search Report for International Patent Application No. PCT/US03/26576, dated Jan. 29, 2004, 7 pages.

* cited by examiner

Primary Examiner—Justine R. Yu
Assistant Examiner—Huyen Le
(74) Attorney, Agent, or Firm—Marshall, Gerstein & Borun LLP

(57) ABSTRACT

A control valve includes a valve body defining a top opening. A bonnet is provided for closing off the top opening of the valve body. A stem housed in the bonnet and the valve housing slidably moves a valve plug in the valve housing to open and close the valve. A packing assembly is provided for sealing between the stem and bonnet, and a packing retainer maintains the packing assembly within the bonnet. A retainer ring is provided for securing the packing retainer in place. The retainer ring can be formed as a generally cylindrical ring that engages the packing retainer and can be tightened on the packing retainer. Outer notches formed in an exterior surface of the lock nut provide for tightening of the lock nut with a tool. In addition, the retainer ring may include a lower portion that closely receives an outer surface of the packing retainer, thereby to center the retainer ring with the packing retainer. Still further, the retainer ring may have an upper portion that automatically centers the retainer ring with the bonnet.

8 Claims, 3 Drawing Sheets

RETAINER LOCK NUT FOR FLUID PRESSURE CONTROL DEVICE

RELATED APPLICATION

This application claims the benefit of U.S. Provisional Application No. 60/410,620, filed Sep. 13, 2002.

FIELD OF THE INVENTION

The present invention generally relates to fluid pressure control devices and, more particularly, to packing retainer assemblies used in such devices.

BACKGROUND OF THE INVENTION

Fluid pressure control devices, such as control valves and regulators, are used in a wide number of process control system applications to control a given parameter of a process fluid (i.e., a liquid, gas, slurry, etc.). While the process control system may ultimately control the pressure, level, pH, or other desired parameter of a fluid, the device basically controls the rate of fluid flow.

Typically, a fluid pressure control device may include a valve body defining a fluid inlet passage coupled through an orifice to a fluid outlet passage. A closure member is positionable with respect to the orifice to control the amount of fluid flow therethrough. The closure member may include a valve plug having a surface which seats against a seat ring located at the orifice. A stem is attached to the closure member for driving the closure member to the desired position.

The stem typically extends through a top opening in the valve body. The top opening is closed off by a bonnet, which supports an actuator. The bonnet includes a bore through which the stem passes to allow the actuator to be operatively coupled to the stem. During operation, the process control system, or an operator manually controlling the fluid pressure control device, moves the valve plug toward and away from a sealing surface of the seat ring to provide a desired fluid flow through the orifice.

Conventional control valves typically include a packing assembly for preventing fluid leakage between the stem and the bonnet bore. An adjustable retainer assembly is often provided for compressing the packing assembly to form a sufficient seal between the shaft and bonnet. For example, commonly assigned co-pending U.S. patent application Ser. No. 10/152,602, entitled "Control Valve Stem Split Guide Bushing," discloses a control valve having a packing retainer 46 threadably received by a lower portion 41 of a bonnet 40. A top surface of the packing retainer 46 pushes washers 49 into a packing assembly 50, thereby to compress the packing assembly. The packing retainer 46 may be threaded into the bonnet 40 to a desired position to obtain the desired compression force on the packing assembly 50.

The control valve disclosed in U.S. patent application Ser. No. 10/152,602 is suitable for many applications. Control valves having larger inlet and outlet ports, or which generate greater pressure drops, however, may generate substantial amounts of vibration that may tend to loosen the threaded connection between the packing retainer and the bonnet. As a result, the compression force on the packing assembly 50 may be reduced, thereby increasing the possibility of control fluid leaks between the stem and bonnet bore. If unchecked over a long period of time, the packing retainer may disengage the bonnet entirely, causing increased leakage and potentially interfering with the operation of the control valve.

It is also important for the stem and plug to be properly aligned with the orifice to avoid undue wear on the moving components and to ensure a sufficient seal in the fully closed plug position. Cage trims, while typically providing superior plug guidance, are not suitable for certain applications where the process fluid is gritty or sticky, and therefore a post-guided plug, such as that disclosed in U.S. patent application Ser. No. 10/152,602, may be used. The threaded connection between the packing retainer and bonnet in that post-guided plug, however, does not precisely position the packing retainer with respect to the stem, and therefore the plug and stem may be misaligned with respect to the orifice, causing increased wear of the trim components and increasing the potential for leaks.

DETAILED DESCRIPTION

Figure 1:
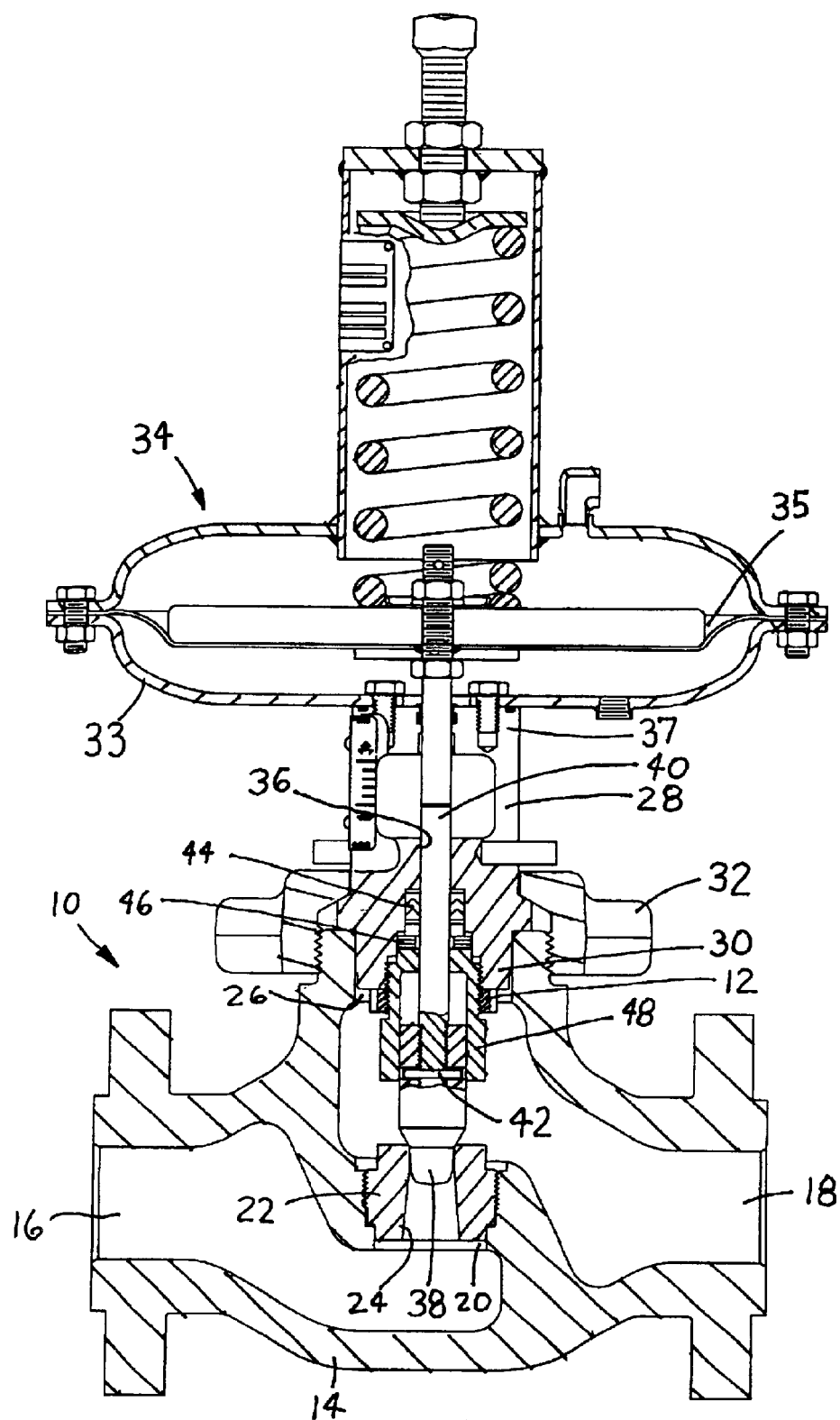
FIG. 1 is a cross-sectional view of a control valve including a packing retainer lock nut in accordance with the teachings of the present invention.

Referring to FIG. 1, a control valve 10 is shown having a retainer lock nut 12 in accordance with certain aspects of the present invention. The control valve 10 includes a valve body 14 defining an inlet passage 16 and an outlet passage 18. An opening 20 connects the inlet passage 16 to the outlet passage 18, and a valve seat 22 is inserted in the opening 20 and defines an orifice 24. The valve body 14 further defines a top opening 26.

A bonnet 28 is provided for closing off the top opening 26 of the valve body 14. The bonnet 28 is removably secured to the valve body 14, such as with a threaded hammernut 32 as shown in FIG. 1. The bonnet 28 includes a lower portion 30 extending through the top opening 26 and into the valve body 14, and an upper portion 37 adapted for attachment to a housing 33 of an actuator 34 having an actuating element such as a diaphragm 35. The illustrated actuator 34 is well known in the art, and therefore it is not described in further detail herein. The bonnet 28 further includes a central bore 36 which, in the illustrated embodiment, is stepped.

A closure member such as valve plug 38 is disposed inside the valve body 14 and is adapted to engage the valve seat 22. The plug 38 is removably coupled to a bottom end of a stem 40, such as with mating threads as shown in FIG. 1. The plug 38 may further be secured to the stem 40 with a pin 42, as described in greater detail in commonly assigned and co-pending U.S. patent application Ser. No. 60/410,496 entitled "Control Valve with Retained Pin for Easy Valve Trim Maintenance", filed on Sep. 13, 2002. The stem 40 is sized to pass through the bonnet central bore 36 and has an upper end coupled to the diaphragm 35. As is generally understood in the art, movement of the diaphragm 35 causes movement of the plug 38. Accordingly, by controlling the pressure present in the upper and/or lower chambers of the actuator housing 33, the position of the plug 38 may be controlled. It will be appreciated that other types of actuators in addition to the diaphragm actuator illustrated in FIG. 1 may be used without departing from the present invention.

A packing assembly 44 is provided for sealing between the stem 40 and bonnet 28. The packing assembly 44 preferably includes a resilient packing material, such as PTFE or graphite elastomers, which may be compressed to create a sealing force between the stem 40 and bonnet 28. Spring washers 46 and a packing retainer 48 are provided to provide a compression force to the packing assembly 44. In the illustrated embodiment, the lower portion 30 of the bonnet 28 has internal threads while an intermediate portion of the retainer 48 may be formed with mating external threads. A boss 49 (FIG. 2) is formed at an upper end of the packing retainer 48 for engaging the spring washers 46. The boss 49 has an outer diameter sized to closely fit a retainer guide surface 51 formed in the bonnet lower portion 30.

Figure 2:
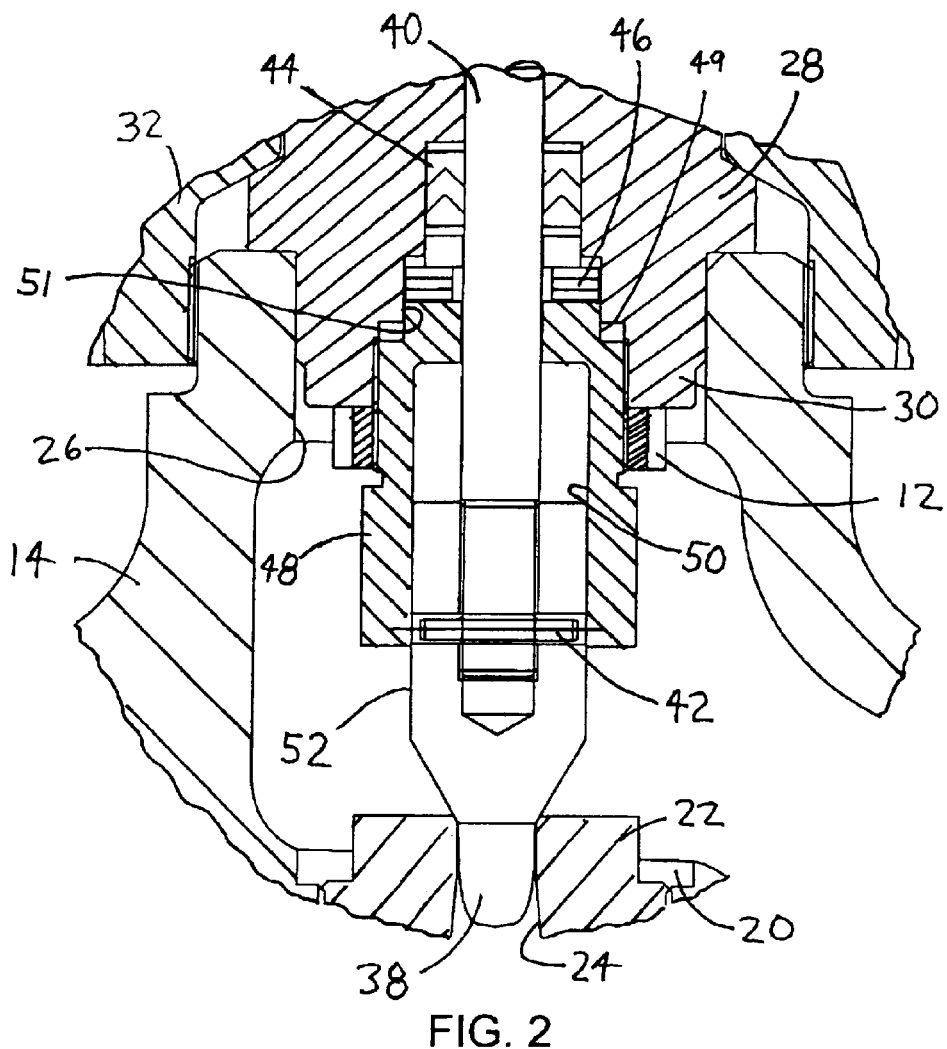
FIG. 2 is an enlarged detail view of a portion of the control valve of FIG. 1.

The packing retainer 48 may be formed with an internal bore 50 that defines a guide surface for the plug 38. As best shown in FIG. 2, the internal bore 50 is sized to closely yet slidably receive an external diameter 52 of the plug 38. Accordingly, the packing retainer 48 not only generates the compression force for the packing assembly 44, but also helps guide the plug 38 toward the seat 22.

The packing retainer 48 may be threaded into the bonnet lower portion 30, so that the upper surface of the boss drives the spring washers 46 toward the packing assembly 44. The packing retainer 48 may be further threaded into the bonnet 28 until the packing assembly 44 is sufficiently compressed to generate the desired seal force. In addition, the outer diameter of the boss 49 and the retainer guide surface 51 of the bonnet 48 may be machined to tolerances that are more tightly controlled than for the threads, so that the packing retainer 48 is more concentrically and axially aligned with the seat ring 22. As a result, the packing retainer internal bore 50, which forms a guide surface for the plug 38, is better aligned with the seat ring 22.

The retainer lock nut 12 is provided for securing the packing retainer 48 in place. As noted above, process fluid passing through the valve body 14 may generate vibrations sufficient to at least partially unthread the packing retainer 48 from the bonnet 28. When the retainer lock nut 12 is attached to the packing retainer 48 and the packing retainer 48 is subsequently attached to the bonnet 28, the lock nut 12 secures the packing retainer 48 in place against the force of any vibrations.

Figure 3:
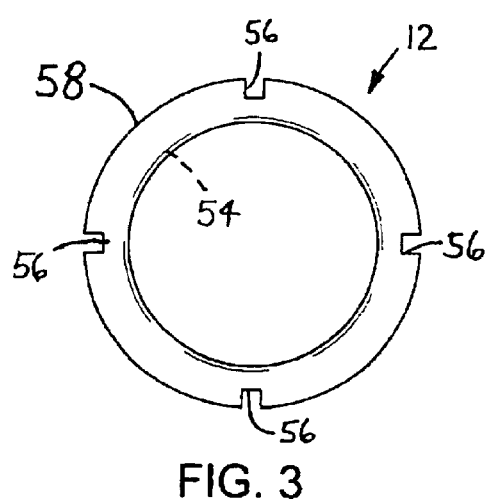
FIG. 3 is a top view of the retainer lock nut of FIG. 1.

As best shown in FIGS. 2 and 3, the lock nut 12 may be formed in a generally cylindrical ring. The lock nut 12 includes internal threads 54 sized to mate with the external threads of the packing retainer 48. Outer notches 56 are formed in an exterior surface 58 of the lock nut 12.

During assembly, the illustrated lock nut 12 is first threadably attached to the packing retainer 48. The packing retainer 48 with attached lock nut 12 may then be threadably attached to the bonnet 28 until an upper surface of the lock nut 12 engages a bottom surface of the bonnet 28. The lock nut may be further tightened so that the packing retainer is more securely held in place. The outer notches 56 facilitate such tightening by allowing a punch, chisel, or similar standard tool to be inserted. The chisel may then be hammered or otherwise struck to rotate the lock nut 12 as desired.

The outer notches 56 provide a significant advantage by allowing the lock nut 12 to be tightened using standard tools, such as a hammer and chisel. Due to the size of the components typically used in a control valve, alternatives to the lock nut 12, such as a hex nut, would require non-standard or special tools to tighten and release. Furthermore, by providing inwardly extending notches, the amount of space inside the valve body 14 needed for the lock nut is reduced. The lock nut 12 is further preferable to using adhesives on the threads between the bonnet 28 and packing retainer 48, since such adhesives typically require the application of heat to disengage the threads. The lock nut 12 may be formed of a corrosion resistant material, such as a metal alloy, to resist chemical attack and corrosion. Additionally, the lock nut 12 allows accurate adjustment and re-adjustment of the compression load on the packing assembly 44 without requiring disassembly.

Figure 4:
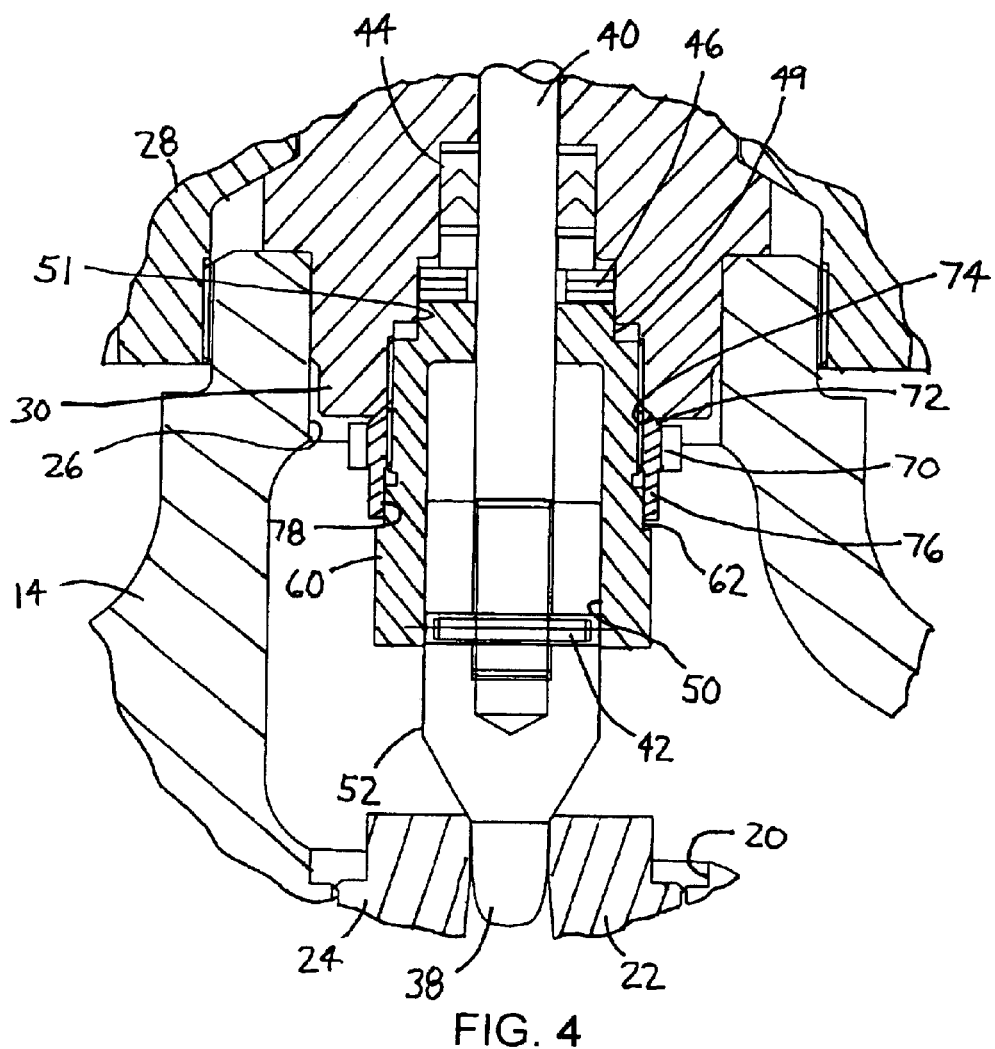
FIG. 4 is a detail view of an alternative embodiment of a packing retainer lock nut.
Figure 5:
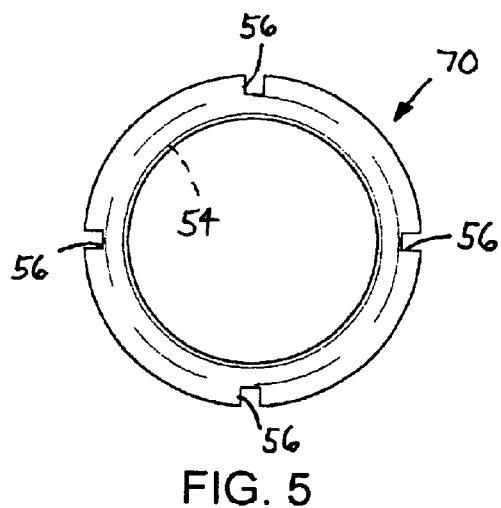
FIG. 5 is a top view of the retainer lock nut of FIG. 4.

An alternative lock nut embodiment is illustrated in FIGS. 4 and 5. Except for the packing retainer 60 and lock nut 70, the main components of the control valve of this embodiment are identical to those of the previous embodiment, and therefore the same reference numbers have been used where applicable.

As in the previous embodiment, the packing retainer 60 includes the boss 49 formed at the upper end for engaging spring washers 46. The outer diameter of the boss 49 closely fits the retainer guide surface 51 of the bonnet lower portion 30 to improve axial and concentric alignment of the packing retainer 60 and bonnet 28. The packing retainer 60 also has the internal bore 50 defining the guide surface for the plug 38.

The packing retainer 60 differs from the previous embodiment by having a second retainer guide surface 62 formed about an exterior of the intermediate portion. The second retainer guide surface 62 may be machined to tight tolerances for purposes described below.

As in the first embodiment, the lock nut 70 may be formed as a generally cylindrical ring having internal threads 54 sized to mate with the external threads of the packing retainer 60. The lock nut 70 may also include outer notches 56 which allow the lock nut to be tightened using ordinary mechanics tools and reduce the amount of space inside the valve body 14 needed for the lock nut.

In addition to the foregoing, the lock nut 70 further includes a chamfered projection 72 that mates with a chamfered recess 74 formed in the bonnet lower portion 30. The lock nut 70 also includes a downwardly projecting cylindrical wall 76 having an interior guide surface 78. The interior guide surface 78 is preferably machined to tight tolerances and is sized to closely receive the second retainer guide surface 62 of the packing retainer 60.

During assembly, the lock nut 70 is first threaded onto the packing retainer 60. The packing retainer 60 (with attached lock nut 70) is then threaded into the bonnet lower portion 30. The chamfered projection 72 of the lock nut 70 and the chamfer of the bonnet lower portion 30 automatically center the lock nut 70 on the bonnet 28. The packing retainer 60 may be inserted into the bonnet lower portion 30 so that the boss 49 is received by the bonnet retainer guide surface 51, thereby forming a first retainer alignment guide. Additionally, the interior guide surface 78 of the lock nut 70 closely fits the second retainer guide surface 62 formed about the intermediate portion of the packing retainer 60, thereby defining a second retainer alignment guide. Accordingly, the packing retainer 60 is guided at two locations, providing more positive and robust alignment of the retainer with the other valve trim components.

From the foregoing, it will be appreciated that the lock nut and packing retainer form a packing retainer assembly that improves concentricity and axial alignment of the trim components in a post-guided control valve. The improved alignment minimizes leakage, extends packing life, and minimizes wear of sliding components.

While the embodiments are described herein as being employed in a control valve, it will be appreciated that the packing retainer assembly may be used in other types of fluid pressure control devices, such as regulators.

The foregoing detailed description has been given for clearness of understanding only and no unnecessary limitations should be understood therefrom, as modifications will be obvious to those skilled in the art.

What is claimed is:

1. A control valve comprising:
   a valve body defining a top opening;
   a bonnet adapted to close the top opening of the valve body, the bonnet including a lower surface and defining a central bore wherein the lower surface of the bonnet includes an inwardly chamfered recess;
   a stem sized for insertion through the bonnet central bore and slidable in the central bore;
   a plug coupled to the stem and adapted to move in the valve body between an open position and a closed position;
   a packing assembly disposed between a portion of the bonnet central bore and the stem for sealing between the stem and the bonnet;
   a packing retainer attached to a bottom end of the bonnet, and adapted to retain the packing assembly within the bonnet central bore and around the stem; and
   a retainer ring including an upper portion having a chamfered projection, the retainer ring being adjustably coupled to the packing retainer wherein tightening the retainer ring on the packing retainer provides mating of the chamfered projection of the retainer ring and the chamfered recess of the bonnet, thereby centering the packing retainer with in the bonnet central bore and engaging the bonnet lower surface to secure the packing retainer in place.

2. The control valve of claim 1, in which the packing retainer includes an externally threaded portion adapted to mate with an internally threaded lower portion of the bonnet.

3. The control valve of claim 2, in which the retainer ring is internally threaded to mate with the externally threaded portion of the packing retainer, wherein tightening the retainer ring on the packing retainer presses the retainer ring against the bonnet lower surface to secure the packing retainer in place.

4. The control valve of claim 3, in which the retainer ring includes a plurality of inwardly extending outer notches sized to receive a tool for rotating the retainer ring on the packing retainer.

5. The control valve of claim 1, in which the retainer ring has an upper portion internally threaded to mate with an externally threaded portion of the packing retainer, and in which a lower portion of the retainer ring includes an inner guide surface sized to closely receive an outer surface of the packing retainer, thereby centering the packing retainer and the retainer ring.

6. A control valve comprising:
   a valve body defining a top opening;
   a bonnet adapted to close the top opening of the valve body and defining a central bore, the bonnet including a lower surface and a bottom portion wherein the bottom portion includes a chamfered recess;
   a stem sized for insertion through the bonnet central bore and slidable in the central bore;
   a plug coupled to the stem and adapted to slidably move with the valve stem in the valve body between an open position and a closed position;
   a packing assembly disposed between a portion of the bonnet central bore and the stem for sealing between the stem and the bonnet;
   a packing retainer attached to a bottom end of the bonnet and adapted to retain the packing assembly within the bonnet central bore and around the stem; and
   a retainer ring having an upper portion and a lower portion, the upper portion including internal threads and a chamfered projection wherein the internal threads adjustably couple to an externally threaded portion of the packing retainer, the retainer ring further including an inner surface for closely receiving an outer surface of the packing retainer to center the packing retainer within the retainer ring such that tightening the retainer ring on the packing retainer provides mating of the chamfered projection of the retainer ring to the chamfered recess of the bonnet thereby engaging the lower surface of the bonnet to secure and center the packing retainer with the bonnet central bore.

7. The control valve of claim 6, in which the retainer ring includes a plurality of inwardly extending outer notches sized to receive a tool for rotating the retainer ring on the packing retainer.

8. The control valve of claim 6, in which the packing retainer includes an externally threaded portion adapted to mate with an internally threaded lower portion of the bonnet.

* * * * *